US010867003B2

(12) United States Patent
O'Donnell et al.

(10) Patent No.: US 10,867,003 B2
(45) Date of Patent: Dec. 15, 2020

(54) METHOD OF ENHANCING CUSTOMER RELATIONSHIP MANAGEMENT CONTENT AND WORKFLOW

(71) Applicant: HubSpot, Inc., Cambridge, MA (US)

(72) Inventors: Christopher O'Donnell, Cambridge, MA (US); Andy Pitre, Somerville, MA (US); Matt Schnitt, Somerville, MA (US); Emit Sit, Cambridge, MA (US); Tim Hennekey, Cambridge, MA (US); Matt Ball, Somerville, MA (US); Greg Brown, Somerville, MA (US); Ze'ev Kaplow, Boston, MA (US); Zoe Sobin, Somerville, MA (US); Jared Williams, Cambridge, MA (US); Marc Neuwirth, Cambridge, MA (US); Ricardo Villamil, Everett, MA (US)

(73) Assignee: HubSpot, Inc., Cambridge, MA (US)

( * ) Notice: Subject to any disclaimer, the term of this patent is extended or adjusted under 35 U.S.C. 154(b) by 227 days.

(21) Appl. No.: 14/854,591

(22) Filed: Sep. 15, 2015

(65) Prior Publication Data

US 2016/0078455 A1 Mar. 17, 2016

Related U.S. Application Data

(60) Provisional application No. 62/050,548, filed on Sep. 15, 2014.

(51) Int. Cl.
*G06F 16/955* (2019.01)
*G06Q 30/02* (2012.01)

(52) U.S. Cl.
CPC ........ *G06F 16/9558* (2019.01); *G06F 16/955* (2019.01); *G06Q 30/0201* (2013.01)

(58) Field of Classification Search
CPC .............. G06F 16/9558; G06F 16/955; G06Q 30/0201
USPC .......... 707/709, E17.112, E17.108; 705/7.29
See application file for complete search history.

(56) References Cited

U.S. PATENT DOCUMENTS

| | | | |
|---|---|---|---|
| 2002/0099697 A1* | 7/2002 | Jensen-Grey | G06F 16/9535 |
| 2008/0172606 A1* | 7/2008 | White | G06F 17/30663 |
| | | | 715/254 |
| 2012/0198056 A1* | 8/2012 | Shama | G06F 17/30616 |
| | | | 709/224 |
| 2013/0007627 A1* | 1/2013 | Monaco | G06F 17/30722 |
| | | | 715/739 |

(Continued)

OTHER PUBLICATIONS

Qureshi, et al., Improving the Performance of Crawler Using Body Text Normalization, 2 Compusoft 7 215, 216 (2013) (Year: 2013).*

*Primary Examiner* — Charles Guiliano
(74) *Attorney, Agent, or Firm* — Goodwin Procter LLP

(57) ABSTRACT

Forward-looking sales activities are poorly served by existing Customer Relationship Managements systems, as the customer information those systems maintain by definition does not include the speculatively interested "leads" pursued in initial sales contacts. An Enrichment database, asynchronously loaded with corporate and optionally individual contact information in anticipation of use, provides real-time access to information in support of such first customer contacts. The Enrichment information may also be used to expedite creation and revision of CRM records.

20 Claims, 14 Drawing Sheets

(56) References Cited

U.S. PATENT DOCUMENTS

2014/0236663 A1\* 8/2014 Smith ................ G06Q 10/0633
705/7.27

\* cited by examiner

METHOD OF ENHANCING CUSTOMER RELATIONSHIP MANAGEMENT CONTENT AND WORKFLOW

CROSS-REFERENCE TO RELATED APPLICATIONS

This application claims priority to U.S. Provisional Patent Application 62/050,548, filed Sep. 15, 2014, entitled "Method of Enhancing Customer Relationship Management Content and Workflow", which is hereby incorporated herein by reference in its entirety for all purposes.

BACKGROUND

Customer Relationship Management (CRM) systems are well known in the art. These systems centralize and organize disparate contact, interest, and purchase information relevant to the communications and correspondence throughout the lifetime of a customer's interactions with a company, service provider, or other entity. Thus, as examples, a corporate customer may be listed along with each of its employees having relevance to the sales cycle: purchasing agents, accountants, signing authorities, as well as interested end-users such as the design engineers who might have provided the initial expression of interest. Records are maintained of correspondence, telephone calls, and meetings between sales and the customer, and past sales history and anticipated new purchase orders may be tracked.

Historically, this information was maintained by each sales person using a Rolodex of business telephone numbers and names, a written list of "leads" provided to them by the marketing department, a file drawer of purchase orders and shipping manifests, and a whiteboard to track the status of each potential sale as it progressed from "interested" to "committed", "negotiating", "closed", and "delivered." Today, this information is maintained in a computerized database such as represented by the well-known CRM software service offered by Salesforce.com, allowing a much higher degree of coordination within the sales team, as well as better information flow between the sales organization and other corporate departments.

SUMMARY OF THE INVENTION

Although CRM systems have become ubiquitous and their functionality essential to a well-run sales operation, this value is not obtained without cost. Maintaining current, accurate, and complete information within a CRM system is often perceived as a "tax" on the sales organization, with the manual or semi-automated data entry of names, contact information, titles, etc. being seen as distraction from the actual sales process. Moreover, the information maintained within the CRM, being focused on existing customers and at best a few aggressively-pursued potential customers, provides little value to a sales person faced with "cold calling" a new lead not already in the database.

In a typical scenario, all that might be known about the sales lead ("prospect") is the name and contact information of the person who had expressed interest, perhaps at a trade show or in response to an advertisement. Thus, the sales person, representing a sales organization, will typically research the prospect's background, starting with a review of their company's web site to understand their general business and products, and to assess their potential needs. During this investigation, other individuals in the company may be identified, as well as other companies partnering or competing with the target company. In this case, the CRM can be queried to determine if any of the related companies or individuals have past association with the sales organization or other people within it. If they are not known (e.g., no other contacts are identified), further web searches of the related companies may be performed to better understand the marketplace in which the target company participates. The lead prospect and any other related individuals identified during this research might be checked using LinkedIn and other social network sites to see if they have any business or social relationships in common, even if indirect via someone else in the sales organization. As with entering data into the CRM, this research is a distraction to actual sales activities, and the time it takes delays the sales person's ability to make a first contact.

While much information may be obtained from a CRM if the communication is with an actively engaged potential customer or existing customer, this is often not the case when addressing a prospect with which no prior communications have been made. In such cases, a conventional CRM system cannot provide instantaneous information about a "cold call" lead for which the CRM has no data.

Embodiments of the present invention provide techniques and supporting systems for configuring and presenting an information "sidebar" within the context of the sales person's existing communications tools. When using an application such as an email system or a web browser-based application, additional information contextual identifiers are gathered from the user's activities in the application. The context information is used to query an external "enhancement" database such that additional information about the entity being researched and relevant to the user's activity can be retrieved and presented to the user. For example, when viewing a company's webpage, the company's domain name may be parsed from the webpage URL and information about that company and other similar or related companies may be displayed in the sidebar. In some implementations operating alongside an email application, information about the email recipient may be displayed based on their email address, including company information based on their company's domain name. The displayed information may include names, roles, and titles of relevant individuals within that company, as well as "social networking" information such as other people within the sales person's company having some association with those individuals.

To obtain information about prospects for which no prior data has been collected in the CRM, preferred embodiments of the invention incorporate an additional data source (referred to herein as an "enrichment" database), which may be queried in a similar manner as the existing CRM database, using a domain name or an email address. Information in the enrichment database may be obtained asynchronously, or directly in response to particular company or individual name queries. As one example, a business wire news feed may be parsed to identify company names in a particular business sector, with each company so identified being looked up in a corporate database (e.g., Dunn and Bradstreet), and then each named executive in the resulting report looked up in LinkedIn, with each company and individual identified in the resulting information potentially becoming a research candidate for a subsequent iteration. Thus, a corpus of information about companies (and optionally, individuals at those companies,) may be obtained, expanding the scope of information available to the sales person beyond what is maintained by the CRM, and independent of any particular queries the sales person is making or may have made in the past.

Another embodiment retrieves comparable enrichment data using information obtained from the World Wide Web, with company information obtained by parsing web page content from the company's website and/or public news sources reporting investments, transactions, and other business news. In some embodiments, an initial list of companies may be based on marketing or business development input. In some embodiments, companies identified during a previous iteration of such web page content parsing are themselves researched in a subsequent iteration. Further embodiments incorporate information from both public and private data sources in the enrichment database.

The resulting corpus of Enrichment information is then made available to the sidebar within the application, regardless of its absence in the actual CRM system. Thus, even a "cold call" email may be drafted with significant information at hand, such as the targeted company's line of business, recent news events concerning that company, common associates or interests the sales person and recipient may have, etc.

In some embodiments, the enrichment corpus may also be used to facilitate data entry into the CRM itself through auto-completion options or drop-down list selections in a CRM data entry form. Thus, once a company domain name or an individual's email address has been entered, other information such as Name, address, industry category, number of employees, blog URL, Twitter handle, etc. will merely require selection or confirmation, rather than manual data entry.

DETAILED DESCRIPTION

Customer Relationship Management

A conventional customer relationship management ("CRM") system maintains records of contacts and interactions associated with a particular customer or potential customer, including relevant corporate information, named individuals in significant roles, purchasing history, etc. As CRM systems are well known in the art, descriptions of their behavior herein should be considered as examples, rather than definitive. Indeed, unless specifically stated to the contrary, for the purposes of describing the invention the CRM component of the described system, apparatus, or method may be taken to be a commercial CRM product, configured for use in the described manner.

Such a generic CRM system may be assumed to support a relatively consistent set of features. Information is structured, so that individuals may be associated with corporate roles, and attributes such as progress status may be associated with objects such as product orders. Controlled change procedures may be provided to, as examples, provide auditable logs of information change activity, or to require particular authority to make such changes. Finally, some form of API or query interface is presumed, to permit information associated with a particular company or individual to be accessed by an external application.

One aspect of the invention improves upon conventional the CRM by adding capabilities to track a wider range of business interactions among vendors and customers. For example, the enhanced features include logging of email communications between employees of the two firms, logging that a customer has opened an email, customer interactions with the vendor website, customer submission of web forms such as surveys, requests for information, and questionnaires, social media mentions by the customer contact, and significant company news events.

This enhanced data can be stored separately (e.g., as a different web based service) and interact with and provide data to the CRM system to allow for more relevant interactions between sales agents and potential customers.

Figure 9:
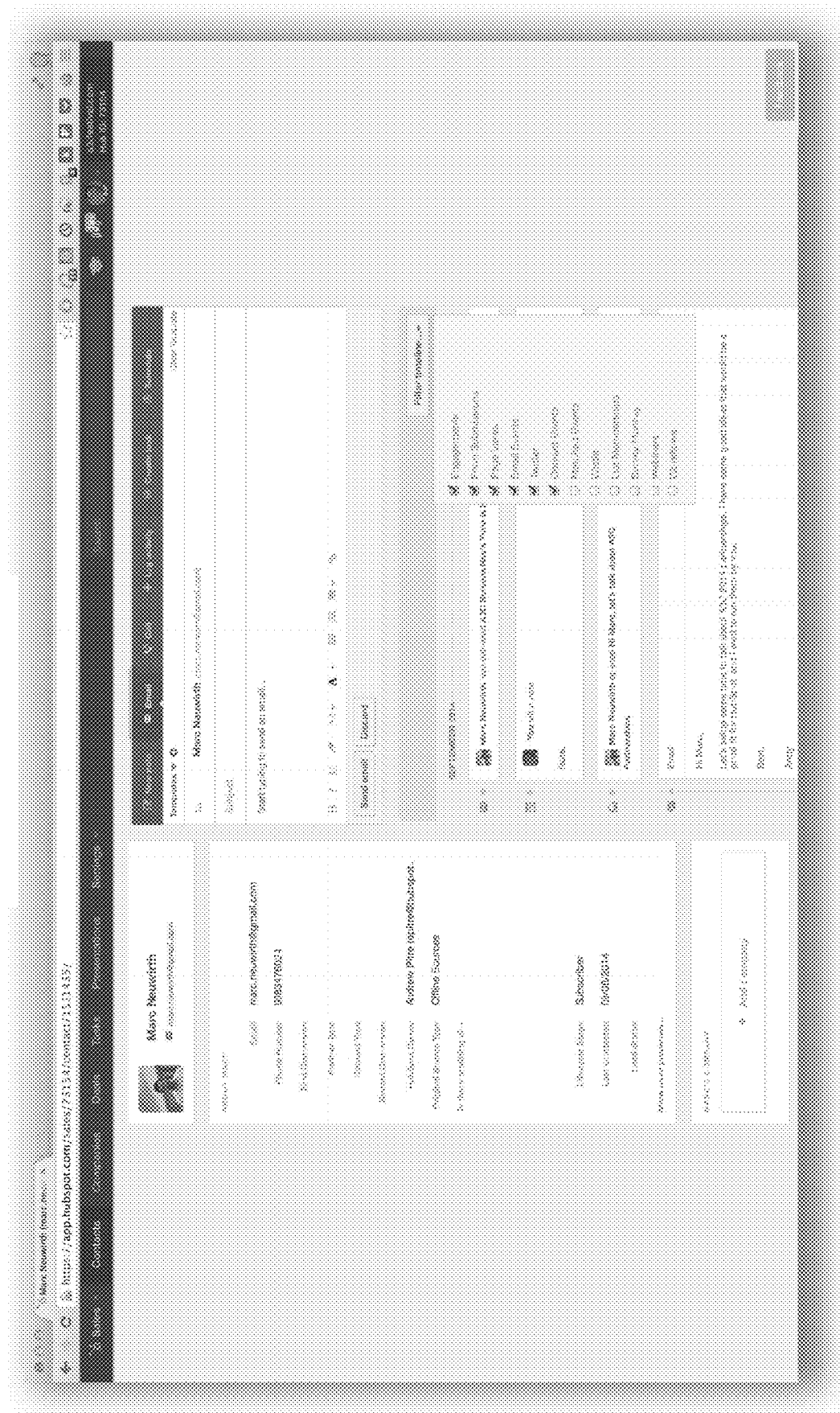
FIG. 9 is a screenshot of the user interface provided by one embodiment of the invention. The user is interacting with a view of CRM data associated with an individual.
Figure 10:
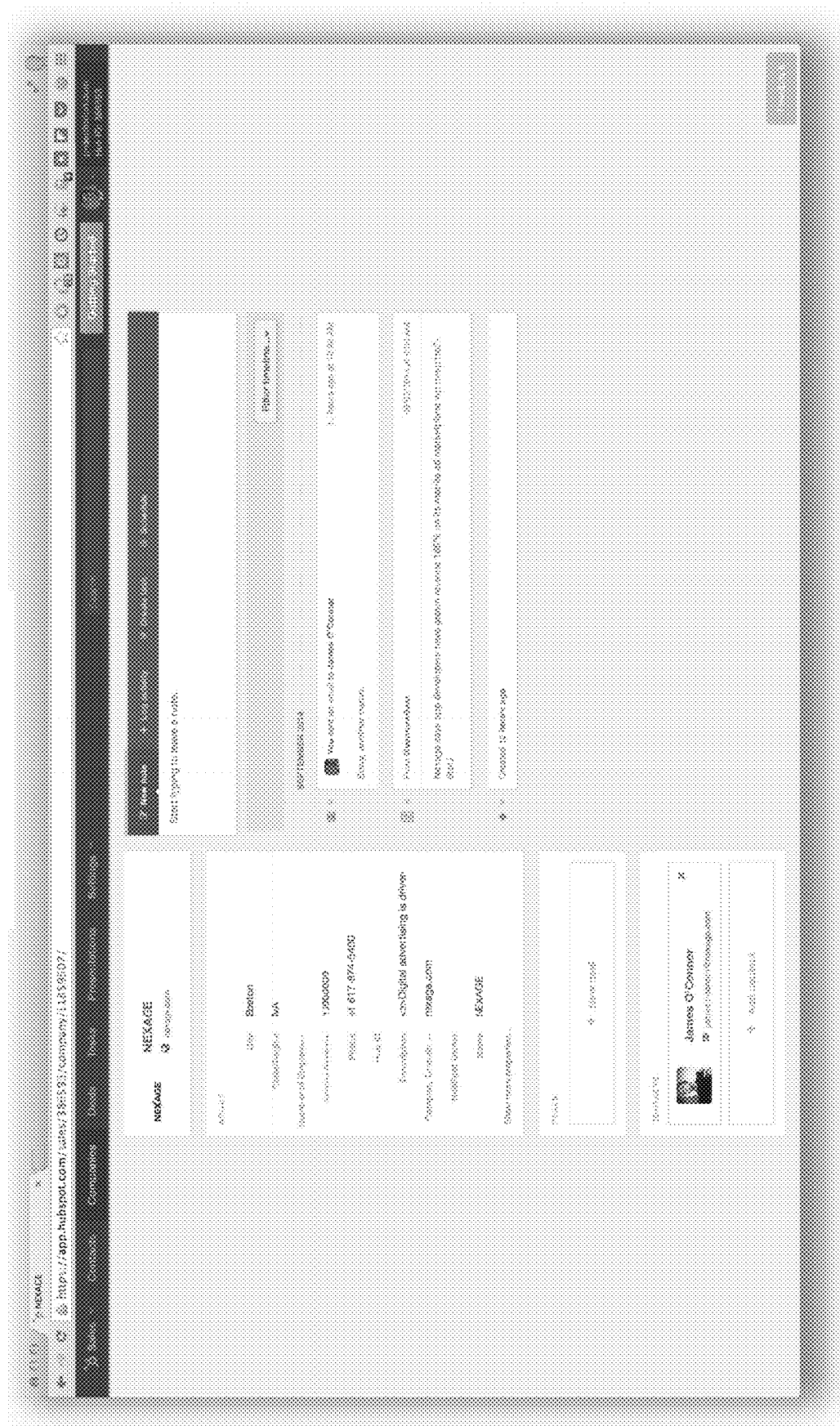
FIG. 10 is a screenshot of the user interface provided by one embodiment of the invention. The user is interacting with a view of CRM data associated with a company.
Figure 11:
FIG. 11 is a screenshot of the user interface provided by one embodiment of the invention. As in FIG. 9, the user is interacting with a view of CRM data associated with an individual. The record of communications activities has been updated to include a recently-sent email.

Screenshots illustrating user access to and interaction with CRM data are shown as FIGS. 9-11.

Enrichment Database

In various embodiments, the enrichment database provides such functionality described above. The database may, in some instances, be implemented as a canonical SQL transaction store, or, in other cases may be a "No SQL" store with more relaxed write constraints. In either case, from the standpoint of the user, the database is accessed as read-only, with data updates rarely modifying existing data elements. Other examples may use a key-value store or other database techniques, using known conventions within the accessing applications to simulate multi-element records and maintain record consistency. Similarly, the interface to the database may be via a network pipe, a named web service, an internal software API, or other equivalent means as known to those familiar with the art. In at least one embodiment, the enrichment database is networked, accessible via public or private Internet connections, and thus may be considered a shared service offering to multiple clients having been provided with appropriate access information.

In at least one embodiment in accordance with the invention, the enrichment database is structured so as to provide results associated with two possible query types—corporate data if queried with a domain name such as "mycompany.com", and personal data about an individual if queried with a fully formed email address such as Joe.Smith@mycompany.com. Query results are provided as a sequence of one or more explicitly typed or named data values, representing the data stored in the database associated with the queried term.

Obtaining Enrichment Data

As previously described, information in the enrichment database is distinguished from that maintained in a conventional CRM in that it may be obtained asynchronously and in anticipation of user need, rather than solely in response to particular company or individual name queries.

Figure 3:
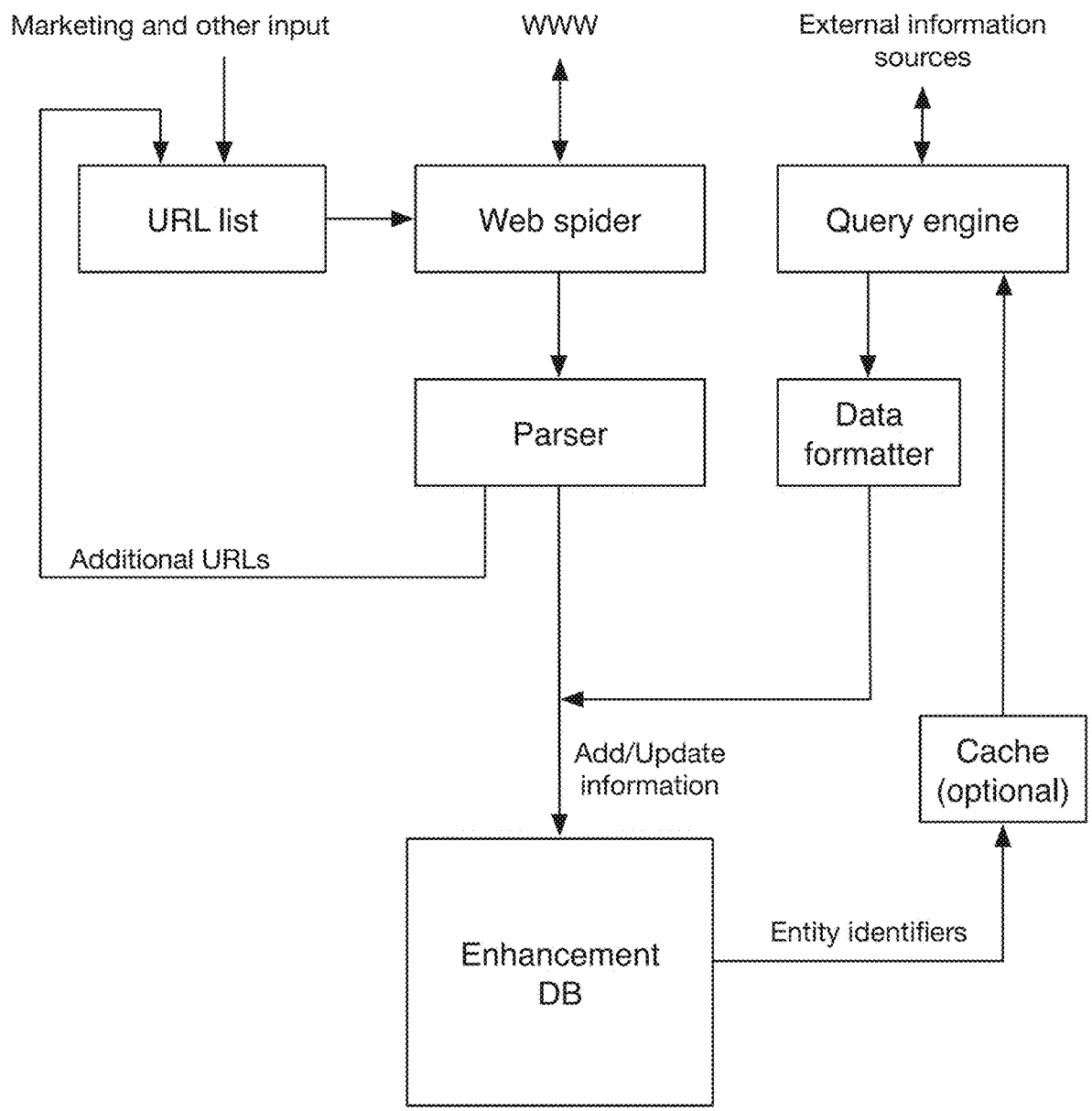
FIG. 3 is a block diagram of one embodiment in accordance with the invention loading Enrichment information into a database from World Wide Web and External information sources.
Figure 4:
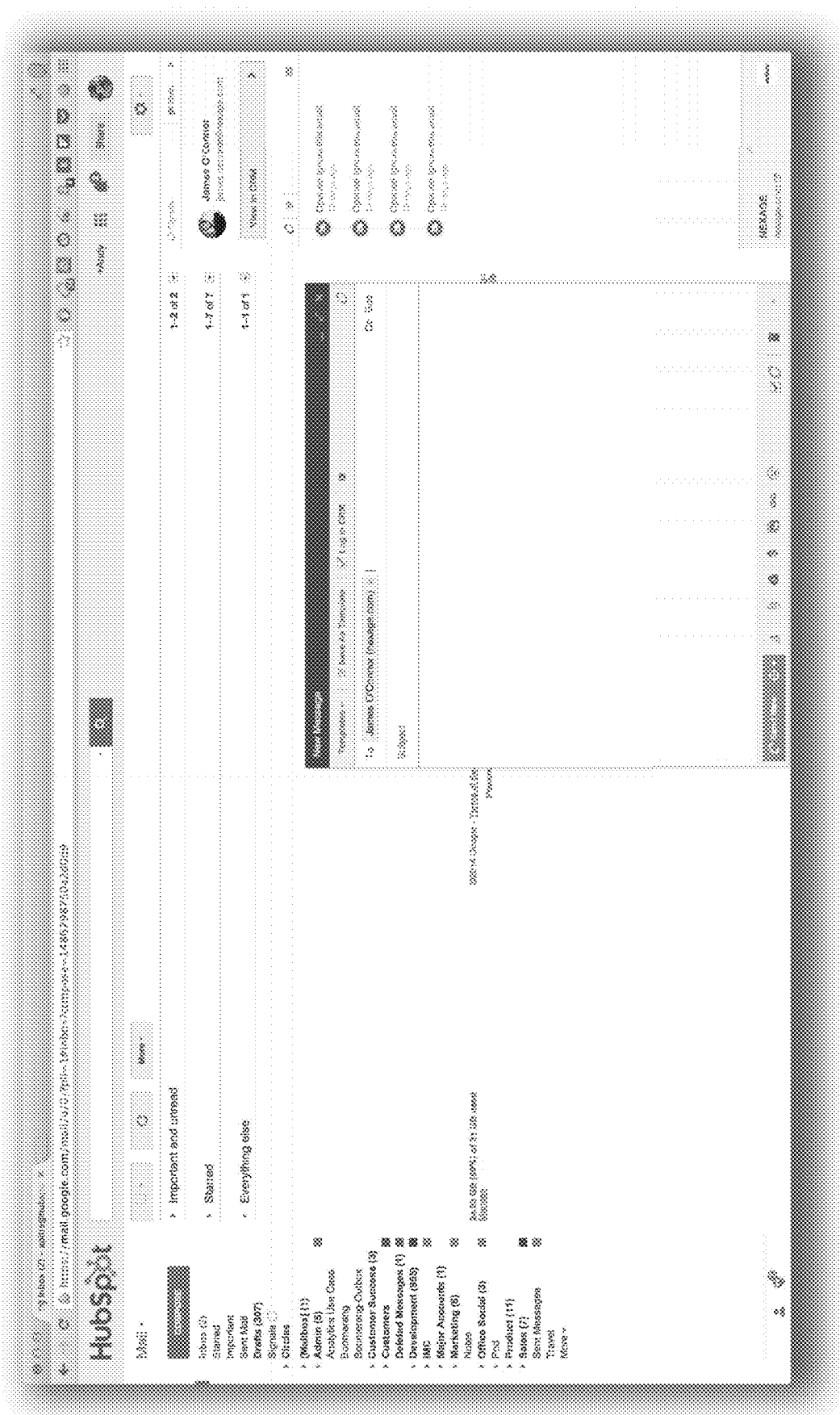
FIG. 4 is a screenshot of the user interface provided by one embodiment of the invention. The user's email activity is enhanced by the information provided in the Sidebar on the right side of the screen associated with the email recipient's address.
Figure 5:
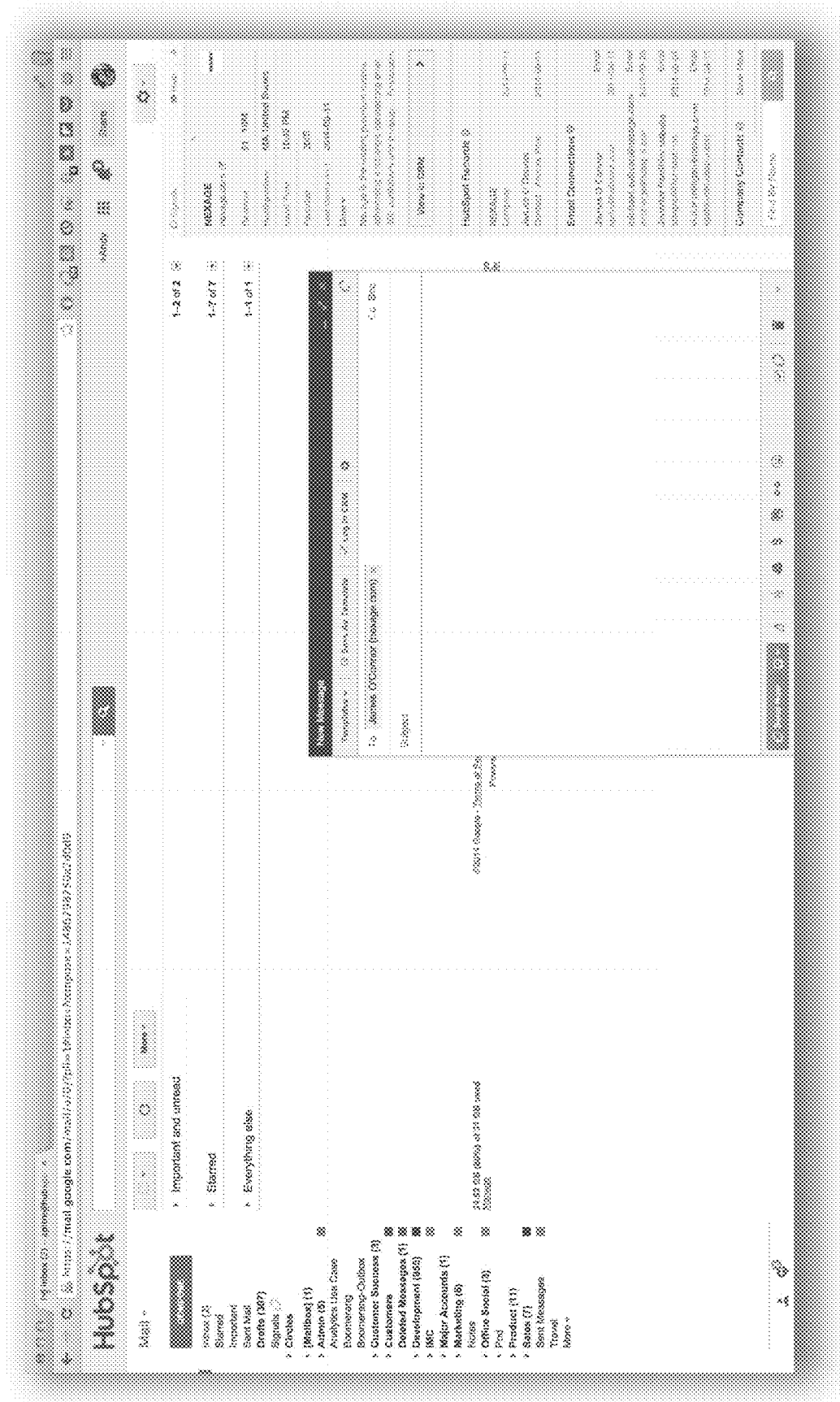
FIG. 5 is another screenshot of the user interface as shown in FIG. 4, in which the Sidebar content is associated with the email addressee's company.
Figure 6:
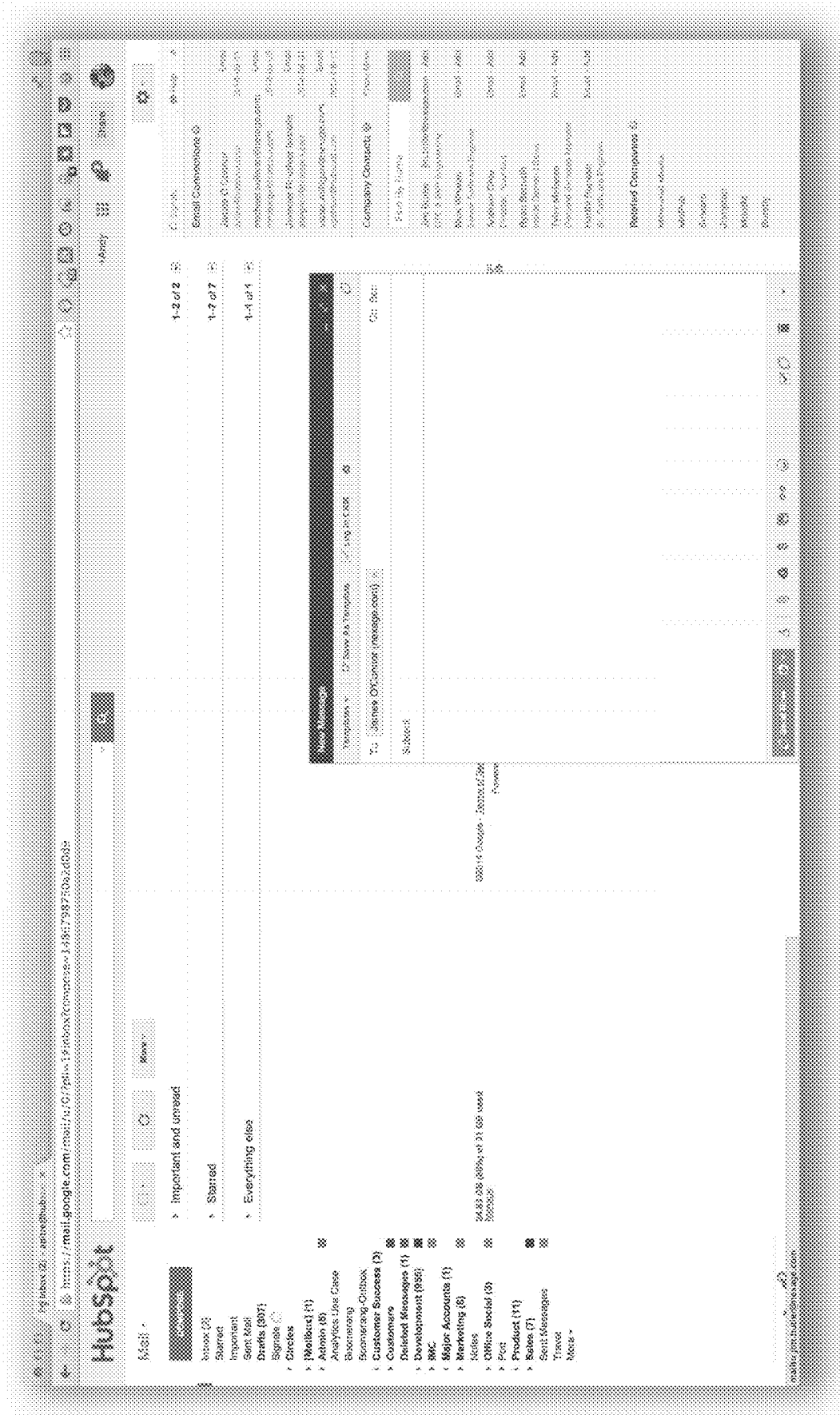
FIG. 6 is another screenshot of the user interface as shown in FIG. 5, in which the Sidebar has been scrolled to show additional company-related content.
Figure 7:
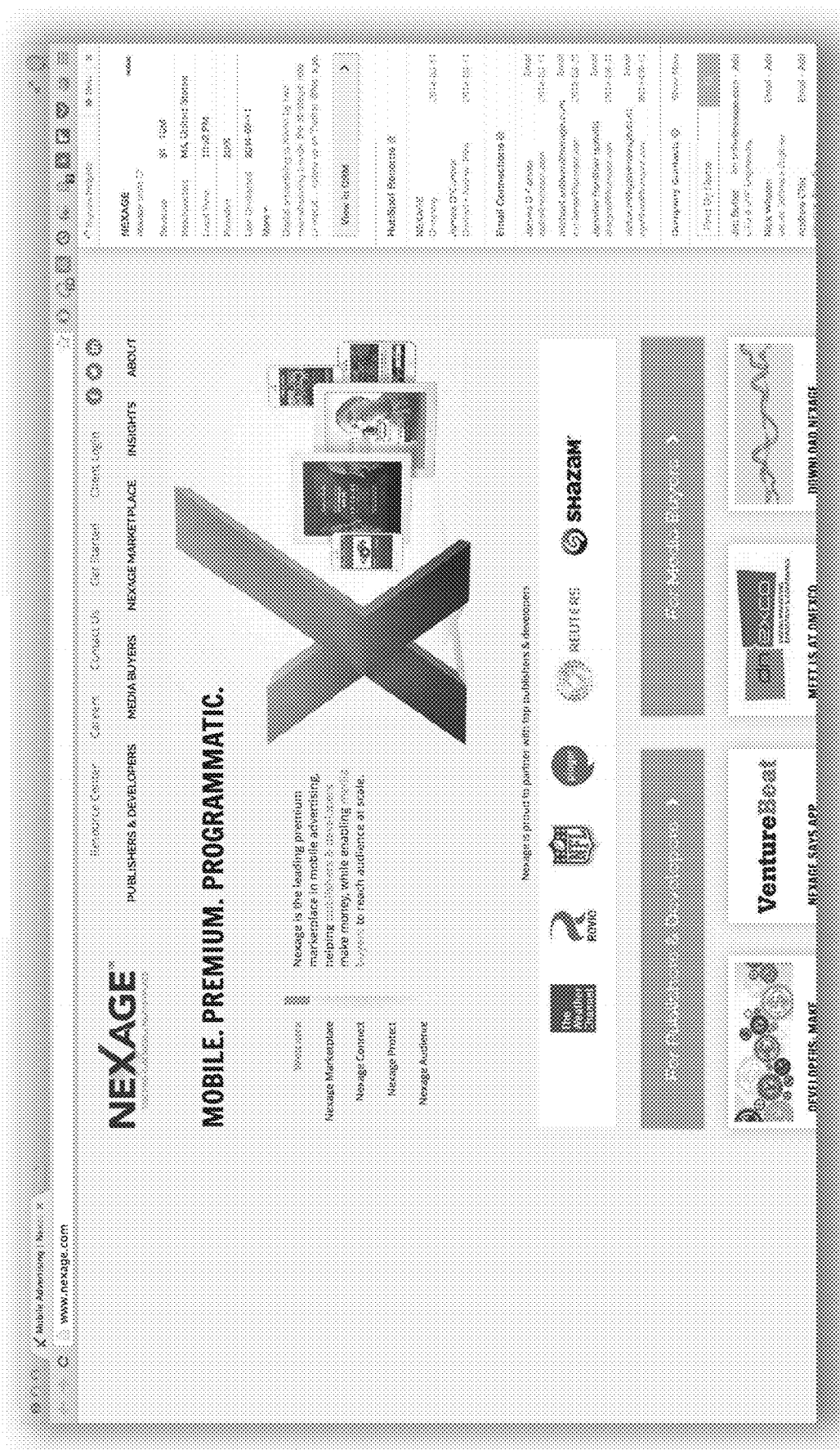
FIG. 7 is a screenshot of the user interface provided by one embodiment of the invention. The user's web browsing activity is enhanced by the company information provided in the Sidebar on the right side of the screen associated with the URL's domain name.
Figure 8:
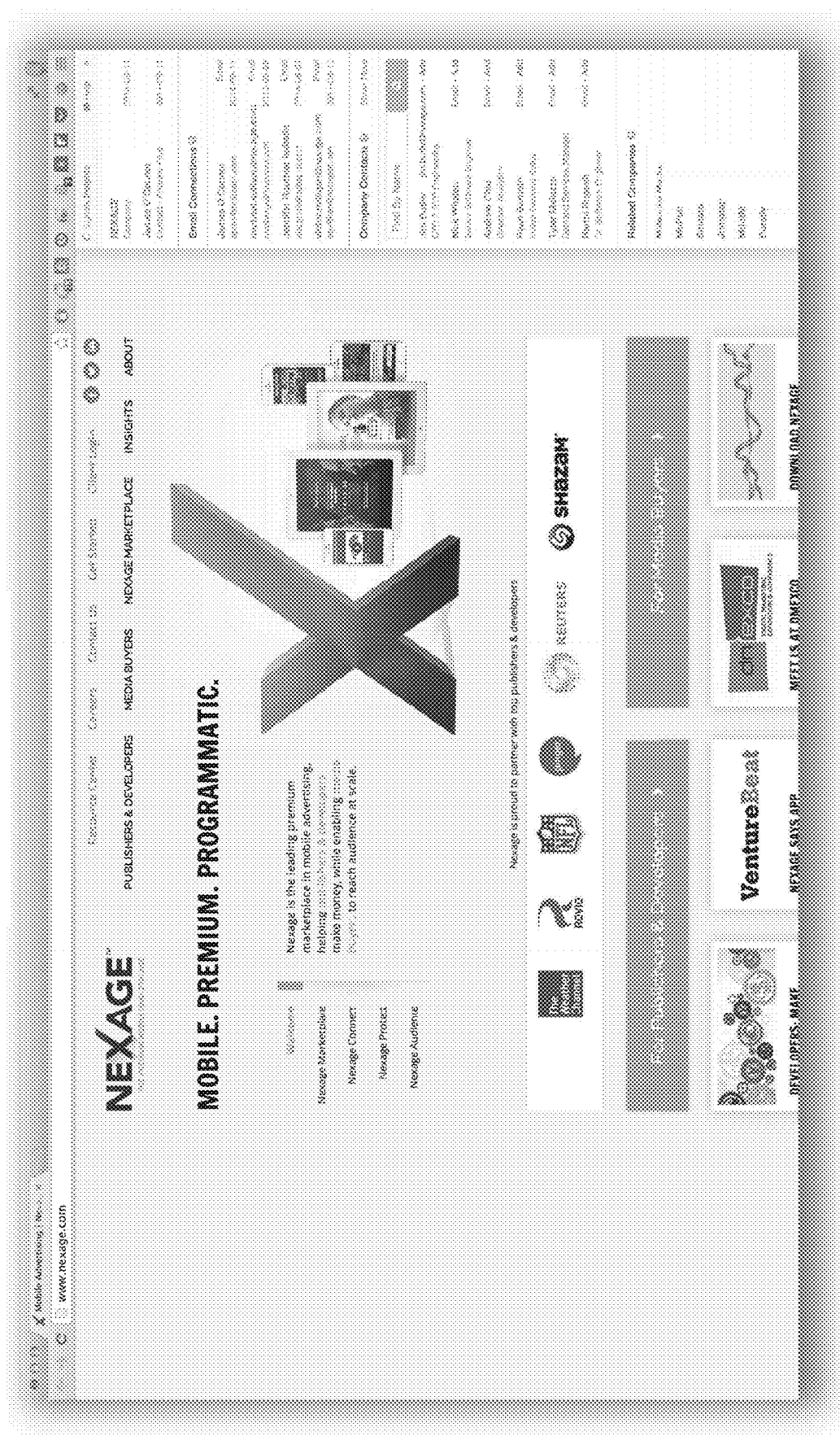
FIG. 8 is another screenshot of the user interface as shown in FIG. 7, in which the Sidebar has been scrolled to show additional company-related content.

In one embodiment in accordance with the invention shown in the block diagram of FIG. 3, a list of one or more candidate URLs is provided based on marketing, business development, or other input. Using these URLs as seeds, a web spider accesses the web page associated with the candidate URL, and presents the results to a parser.

The parser performs two functions; it attempts to identify elements within the web content that represents desired data types, for example the address, street, city, town, zip code, etc. comprising a corporation's business address. These identified elements are presented to the enrichment database to be incorporated in records associated with a key value related to, in this example, the corporation (i.e. its domain name.) The parser also identifies additional URLs and/or email addresses within the web content, which may be used in subsequent iterations of the web spider. Thus, a corporate home page may lead to an "About us" page, an "Investors" page, a "Contact" page, an "Our Executives" page, with each of those pages becoming candidates for access by the web spider with subsequent content parsing and updating of the enrichment database.

A preferred embodiment of the parser performs the data extraction automatically, although other embodiments may incorporate semi-automated or manual steps as well.

Email addresses captured by a corporation web sweep cannot be directly used in the same way as a captured URL, either to iterate the web spider operation, or to obtain an individual's information. Instead, other sources of information may be required which can provide relevant user information based on their email address.

As one example, an Internet "White Page" service may be used, which are structured as "email address in, personal information out" and thus could be used directly to look up an individual's background information. However, the quality and reputation of the provided information from such sources may be suspect. As other examples, social networking sites such as Facebook and LinkedIn may provide information within their particular domains, and private and for-fee information services also exist providing such services.

Because the access methods required to interact with these disparate information sources are broader and more elaborate than simple "web spider" behavior, FIG. 3 shows a query engine providing scripted or programmatic interaction with the selected external information source or sources. The resulting information, which may be in the form of web content or provided as explicit query responses, is presented to a data formatter, which manipulates the data into a form appropriate for storage in the enrichment database. Such a query engine may be used to research corporate information, as well as being a source for information about individuals.

Thus, it is apparent that the information flow for enrichment information may follow two distinct paths; the initial URL is used by the Web spider to access a web page, which is parsed to identify corporate information to be stored in the enrichment database, which may include the email addresses of various individuals. Optionally, entity identifiers representing either corporations or individuals may subsequently be retrieved from the enrichment database and presented to the query engine, which accesses external information sources to obtain results processed by the data formatter and stored as corporate or individual information respectively in the enrichment database. In some embodiments, a cache or storage buffer may be used to hold the identity identifiers for processing by the query engine, eliminating the need for them to be read out of the enrichment database at the time they are required by the query engine.

Other embodiments may use different strategies to distribute information queries between World Wide Web and other information sources. In some instances, but the information sources may be limited to private, for-fee information sources to obtain both corporate and individual information. As one example, the Dow Jones business wire news feed may be parsed to identify company names in a particular business sector, with each company so identified being looked up in Dunn and Bradstreet, and then each named executive in the D&B report looked up in a private executive resume database, with each company and individual identified in the resulting information potentially becoming a research candidate for a subsequent iteration. However, such a limitation may be neither cost-effective nor optimum, given the broad range of timely and freely-available information available on the Web.

Another embodiment uses World Wide Web sources to research corporate information, with the only individual information being maintained in the enrichment database being that which may be obtained incidentally through such corporate research, as examples those individuals named as a corporate executive or contact person.

One embodiment in accordance with the invention supports data types or named data values in both the parser and the enrichment database which describe:

Corporate Identification—Public/Private corporate status, company description, company business address, company industry category, number of employees, annual revenue, latitude and longitude of primary company location.

Corporate communications information—Company email address, twitter username, number of twitter followers, twitter URL. Corporate Facebook page URL, number of Facebook fans. LinkedIn Company Bio, LinkedIn company URL. URL of company logo, Favicon.

Corporate investment—Public/Private status, revenue, number of employees, year of founding, total investment, Angel List URL, Crunchbase URL, Company contacts, Related companies, Company news.

Another embodiment also supports data associated with the company's industry, territory, additional contact email addresses and phone numbers, org charts, website technology, products/services offered, company sentiment, enumeration of current and past funding rounds and investors, significant job and title changes, and partnerships.

Sidebar Application

In at least one embodiment in accordance with the invention, the sidebar display element is implemented as a web browser plug-in. As such, it has access to the information being used to draw the screen, such as the HTML encoded stream comprising a web page, and can detect and extract particular data fields from that encoded stream automatically.

Figure 1:
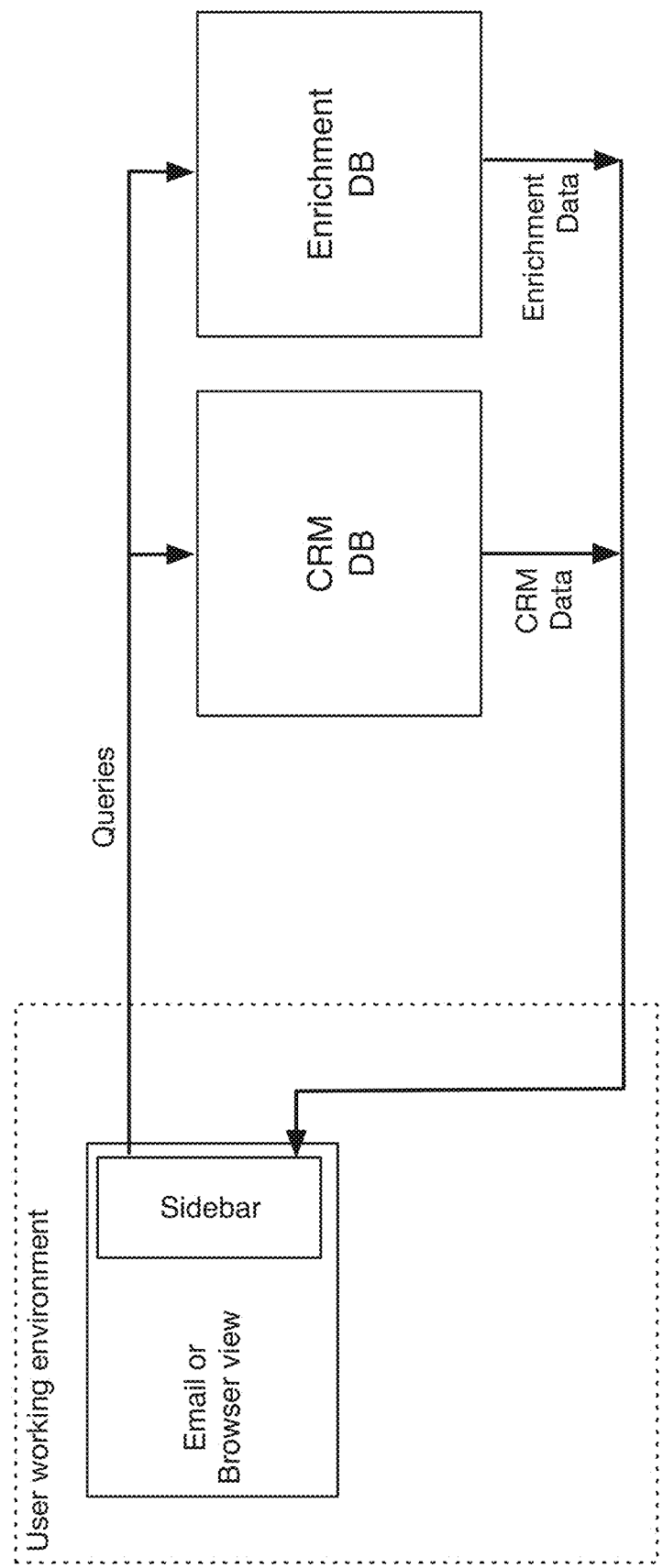
FIG. 1 is a block diagram of an embodiment in accordance with the invention, where a Sidebar application in the user's working environment accesses CRM information and Enrichment information for display.

As seen in FIG. 1, the Sidebar-enhanced browser may be used with a conventional web-based email application or may be used for conventional web browsing within the user's working environment.

One embodiment of the sidebar is configured to parse URLs, stand-alone domain names such as www.mycompany.com, and email addresses from the displayable browser content and/or the browser address bar. Corporate URLs and domain names are reduced to a canonical form (e.g. absent any subdomain or host elements) to be used as a query term to obtain corporate enrichment information from the Enrichment database and/or the CRM. An extracted email address may also be used as a query term to obtain individual enrichment information from the enrichment database and/or the CRM.

Some embodiments of the Sidebar may be configured to record URLs for which the enrichment database provides no results. These records may be added to the candidate URL list for addition to the enrichment database in a subsequent iteration of the information gathering process.

One embodiment of the sidebar interacts with the enrichment database as a web service, sending queries and receiving query results, which it then formats into displayable lists within the Sidebar display portion of the screen. Depending on the amount of content and available display area, the display content may be scrolled, or certain portions hidden or tree-truncated until requested by the user.

In another embodiment, the sidebar also interacts with the CRM system, displaying any corporate or individual information stored by the CRM as well. Thus, referring again to FIG. 1, the sidebar component of the user's browser issues queries to one or both of the CRM and enrichment databases, and receives in return CRM and/or Enrichment data which it may display in the sidebar portion of the user's browser window.

Figure 12:
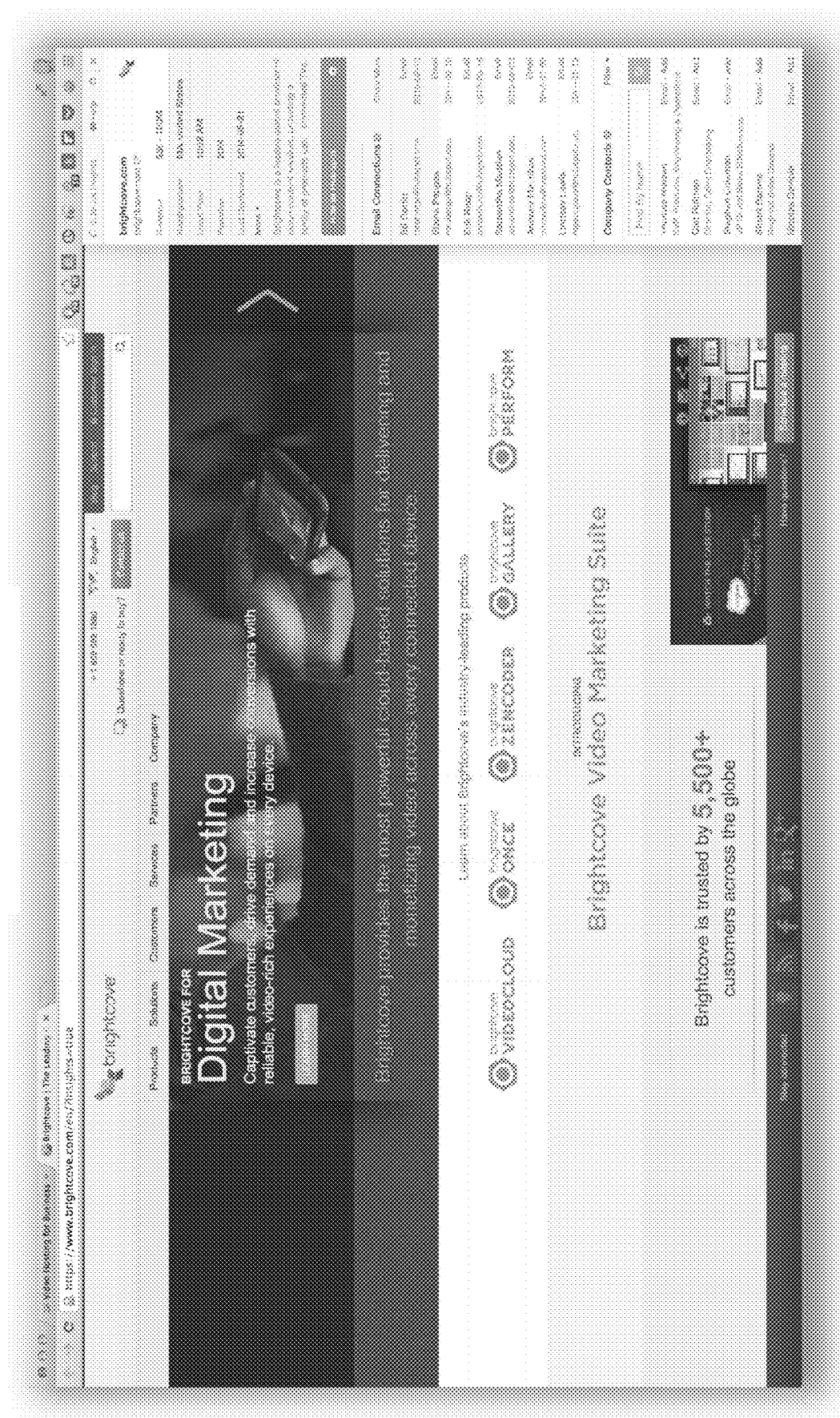
FIG. 12 is a screenshot of the user interface provided by one embodiment of the invention during browsing activity similar to that shown in FIG. 7. As there is no record of this company in the CRM, the Sidebar offers an option to add a CRM entry.
Figure 13:
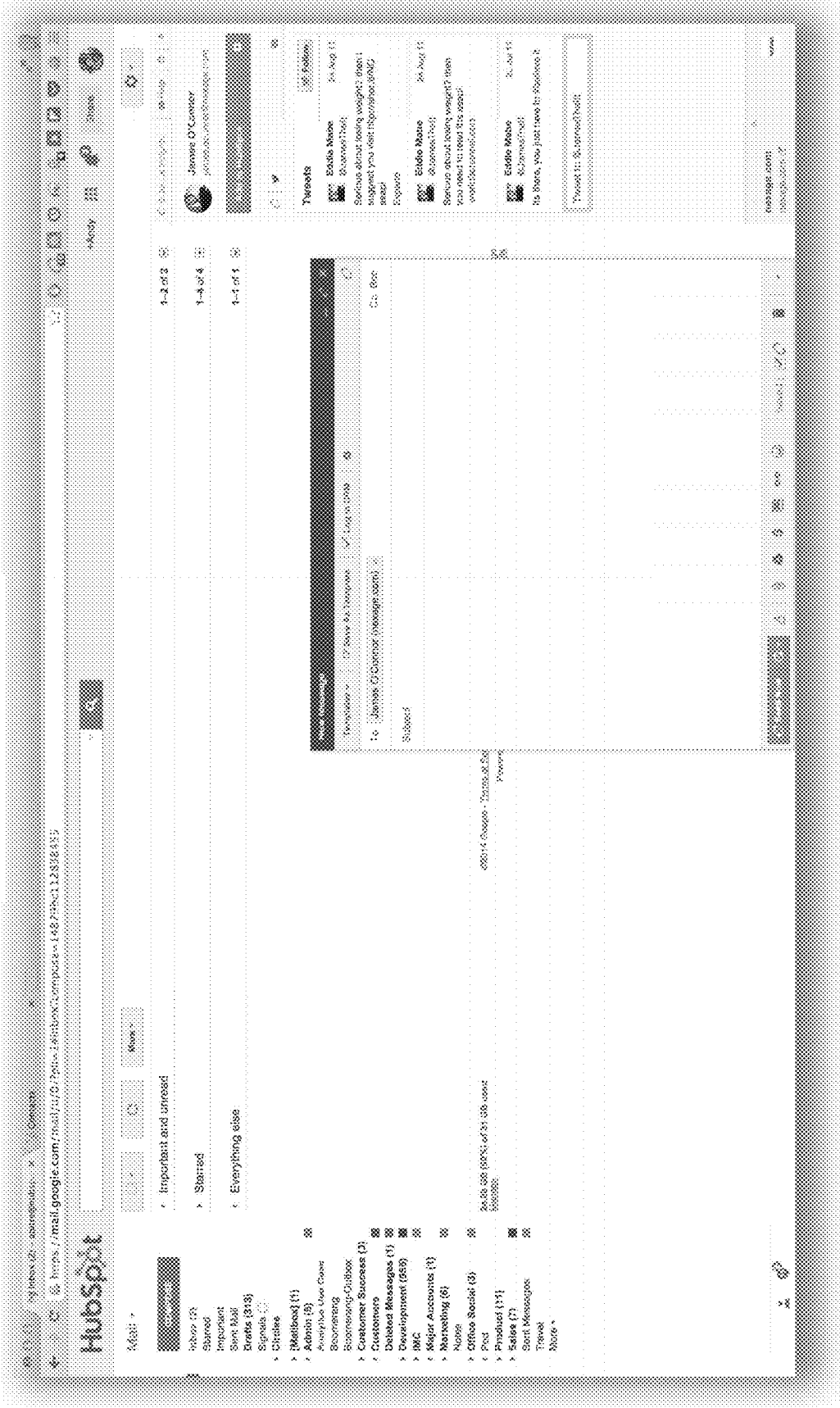
FIG. 13 is a screenshot of the user interface provided by one embodiment of the invention during email activity similar to that shown in FIG. 5. As there is no record of this company in the CRM, the Sidebar offers an option to add a CRM entry.

In cases where enrichment data is available but there is no corresponding CRM information, some embodiments of the sidebar offer an option to create a new CRM record. FIG. 12 shows a sidebar with an "Add to HubSpot" (the name of the CRM database product in this example) button where the user is viewing a company's website in their browser and there is no CRM information about that company. FIG. 13 shows a sidebar with an "Add to HubSpot" button where the user is composing an email to a recipient, and there is no CRM information about the recipient's company.

One familiar with the art may note that the formatting of information for Sidebar display may equivalently be performed by the queried web service, or by a service intermediary between the Sidebar application and the queried database. Similarly, display formatting may be hard-coded, or configured using CSS or other meta-formatting elements. Logical decision steps may be incorporated into the display formatting to, as non-limiting examples, organize the displayed order of results, hide and reveal certain results, and otherwise maximize the relevance of the displayed sidebar information to the user's current working activity.

Screenshots of one embodiment of the Sidebar application displaying information relevant to the current working context in accordance with the invention may be seen in FIGS. 4-8.

Updating CRM Information

Figure 2:
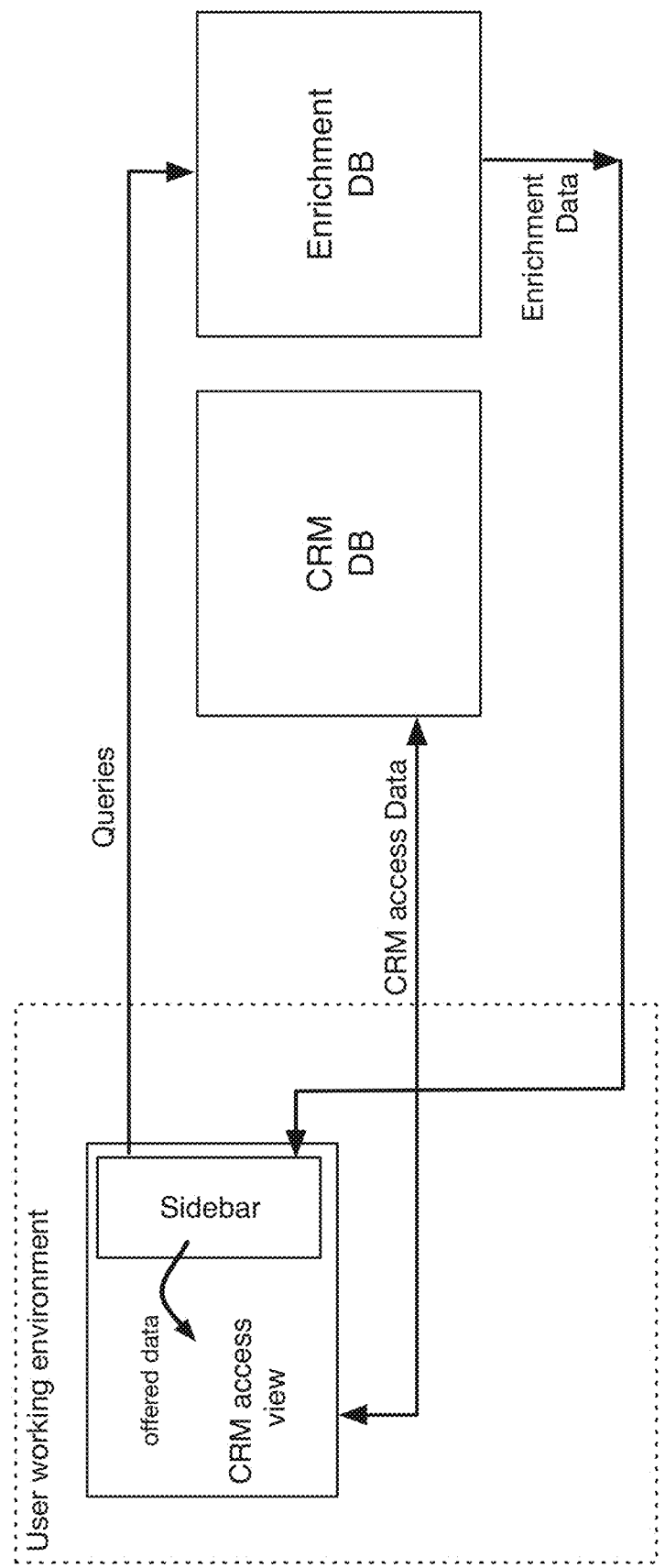
FIG. 2 is a block diagram of an embodiment in accordance with the invention, where a Enrichment data is offered to a CRM application to avoid manual data entry.
Figure 14:
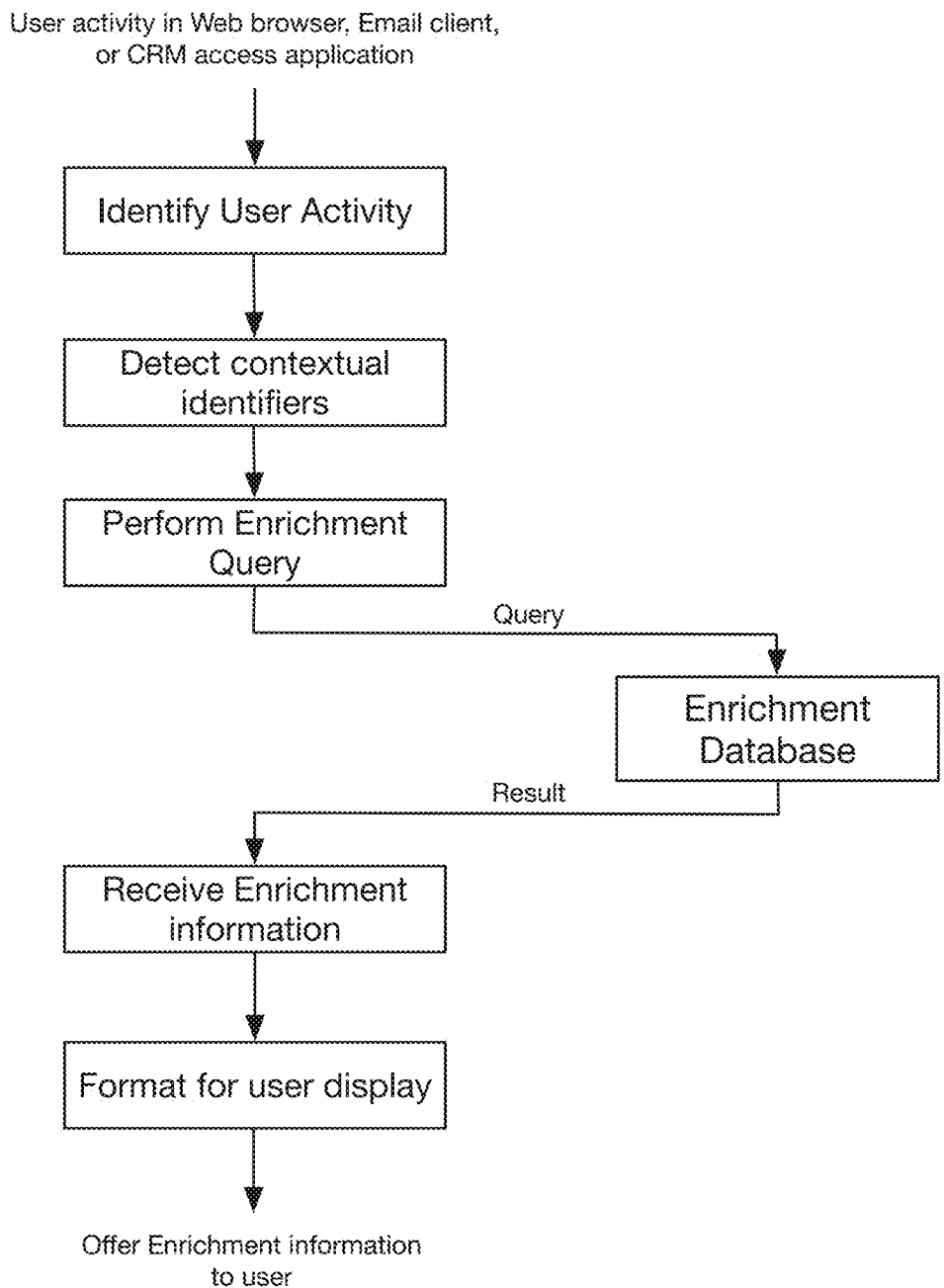
FIG. 14 is a flow chart for one embodiment of a method used to provide context sensitive enrichment information to an interactive user.

At least one embodiment in accordance with the invention facilitates creation of new CRM records. As one example, sidebar display of corporate enrichment data for an entity not having a presence in the CRM may include an "Add to CRM" button. Clicking on that button will transfer the user to a CRM interaction session, allowing the normal CRM tools to be used to create a new entry for that entity. Some embodiments allow the relevant corporate enrichment data to be provided to the CRM session, avoiding the need for manual data entry. One embodiment provides the enrichment data as autocompletion options for CRM fields. Another embodiment provides the Enrichment data in pull-down selection boxes, allowing the user to select the data for automatic entry. Some embodiments match the data types of the Enrichment data and the CRM data entry fields so that only relevant data is presented for selection or use. FIG. 2 shows the offering of enrichment data to a CRM access view as part of such a user interaction session and FIG. 14 is a flow chart of one embodiment of a method.

As a general matter, the techniques described herein can be implemented in any appropriate hardware or software. If implemented as software, the processes can execute on a system capable of running one or more commercial operating systems such as the Microsoft Windows® operating systems, the Apple OS X® operating systems, the Apple iOS® platform, the Google Android™ platform, the Linux® operating system and other variants of UNIX® operating systems, and the like. The software can be implemented on a general purpose computing device in the form of a computer including a processing unit, a system memory, and a system bus that couples various system components including the system memory to the processing unit.

If implemented as software, such software can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

We claim:

1. A system comprising:
   at least one memory storing computer-executable instructions; and
   at least one processor for executing the instructions stored on the at least one memory, wherein execution of the instructions causes the at least one processor to perform operations for enhancing a user interface of a network-based application, the operations comprising:
   iteratively building a database comprising a plurality of database records associated with a respective plurality of entities, wherein building the database includes, for each entity of the plurality of entities:

(a) receiving seed data associated with the entity, the seed data including one or more uniform resource locators (URLs) associated with the entity;
   (b) parsing content of one or more web pages corresponding to the URLs into a plurality of parsed elements;
   (c) identifying one or more email addresses in the plurality of parsed elements of the one or more web pages corresponding to the URLs;
   (d) submitting the one or more email addresses in the plurality of parsed elements to one or more query engines of one or more external information sources, and in response, receiving a plurality of query response elements;
   (e) identifying a plurality of additional elements from the parsed elements and the query response elements, wherein at least one of the additional elements is entity background information, and at least one of the additional elements is an additional URL, wherein the entity background information is neither an email address nor a URL;
   (f) storing the one or more email addresses and the entity background information in the database in one or more database records associated with the entity; and
   (g) repeating steps (a)-(f) using the at least one additional URL as the seed data; and
   automatically contextualizing information displayed by the user interface, including:
   detecting, by a network-based application, one or more contextual identifiers based on user actions performed within the network-based application, the one or more contextual identifiers associated with a particular entity of the plurality of entities;
   generating a search query including the one or more contextual identifiers associated with the particular entity;
   sending the search query to the database;
   receiving enrichment information from the database based at least in part on the search query;
   formatting the enrichment information for display based on an amount of the enrichment information and an available display area in a sidebar component of the user interface of the network-based application; and
   displaying the formatted enrichment information in the sidebar component of the user interface.

2. The system of claim 1, further comprising a customer relationship management (CRM) application, wherein the CRM application maintains data relative to customers and their representatives, wherein the CRM application is further configured to provide elements of said data to users, and wherein the database queried by the network-based application is distinct from the CRM application.

3. The system of claim 2, wherein the network-based application is associated with a user identifier and comprises one of an email application and a web browser, and the user identifier is correlated with user access activities within the CRM application.

4. The system of claim 1, further comprising the database, wherein the database is an enrichment database communicating with the network-based application.

5. The system of claim 4, wherein at least a portion of data retrieved from the enrichment database data is obtained independent of user actions performed within the network-based application.

6. The system of claim 5, wherein the enrichment database is provided as a web service.

7. The system of claim 4, wherein the enrichment database responds to queries incorporating a contextual identifier comprising a network domain name by providing corporate business information relevant to an entity associated with the network domain name.

8. The system of claim 4, wherein the enrichment database responds to queries incorporating a contextual identifier comprising an email address by providing information associated with an entity associated with the email address.

9. The system of claim 7, wherein at least a portion of the corporate business information is obtained from public web pages.

10. The system of claim 1, wherein a portion of the enrichment information is offered for user selection as an auto-completion option for user data entry in the user interface of the network-based application.

11. The system of claim 1, wherein the plurality of entities comprise at least one of corporate entities and individual entities.

12. The system of claim 1, wherein detecting a contextual identifier by the network-based application comprises extracting a network domain name or an email address of an entity associated with the contextual identifier from data obtained by the network-based application and used by the network-based application to display application information.

13. A computer-implemented method for providing enhanced sales support to users of a customer relationship management (CRM) application and for enhancing a user interface of the CRM application, wherein the CRM application maintains current and historical business-related data relative to customers, the method comprising:
    iteratively building a database comprising a plurality of database records associated with a respective plurality of entities, wherein building the database includes, for each entity of the plurality of entities:
        (a) receiving seed data associated with the entity, the seed data including one or more uniform resource locators (URLs) associated with the entity;
        (b) parsing content of one or more web pages corresponding to the URLs into a plurality of parsed elements;
        (c) identifying one or more email addresses in the plurality of parsed elements of the one or more web pages corresponding to the URLs;
        (d) submitting the one or more email addresses in the plurality of parsed elements to one or more query engines of one or more external information sources, and in response, receiving a plurality of query response elements;
        (e) identifying a plurality of additional elements from the parsed elements and the query response elements, wherein at least one of the additional elements is entity background information, and at least one of the additional elements is an additional URL, wherein the entity background information is neither an email address nor a URL;
        (f) storing the one or more email addresses and the entity background information in the database in one or more database records associated with the entity; and
        (g) repeating steps (a)-(f) using the at least one additional URL as the seed data; and
    automatically contextualizing information displayed by the user interface, including:
        identifying a user access activity within the CRM application;
        detecting, by the CRM application, one or more contextual identifiers based at least in part on the user access activity within the CRM application, the one or more contextual identifiers associated with a particular entity of the plurality of entities;
        generating a search query including the one or more contextual identifiers associated with the particular entity;
        submitting the search query to the database;
        receiving enrichment information from the database based at least in part on the search query;
        formatting the enrichment information for display based on an amount of the enrichment information and an available display area in a sidebar component of the user interface of the CRM application; and
        displaying the formatted enrichment information in the sidebar component of the user interface.

14. The method of claim 13, wherein the enrichment information is offered for user selection from a list.

15. The method of claim 13, wherein a portion of the enrichment information is offered for user selection as at least one auto-completion option for user data entry in the user interface of the CRM application.

16. The method of claim 13, wherein the database is provided as a web service to the CRM application.

17. The method of claim 13, wherein at least a portion of data retrieved from the database is obtained independent of user access activity within the CRM application.

18. The method of claim 13, wherein the database responds to queries incorporating a contextual identifier comprising a network domain name by providing corporate business information relevant to an entity associated with the network domain name.

19. The method of claim 13, wherein the database responds to queries incorporating a contextual identifier comprising an email address by providing information associated with an entity associated with the email address.

20. The method of claim 18, wherein at least a portion of the corporate business information is obtained from public web pages.

* * * * *

UNITED STATES PATENT AND TRADEMARK OFFICE
CERTIFICATE OF CORRECTION

PATENT NO. : 10,867,003 B2  
APPLICATION NO. : 14/854591  
DATED : December 15, 2020  
INVENTOR(S) : Christopher O'Donnell et al.

Page 1 of 1

It is certified that error appears in the above-identified patent and that said Letters Patent is hereby corrected as shown below:

On the Title Page

At item (72) Inventors, delete "Emit Sit" and insert --Emil Sit--.

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*